Dec. 29, 1936. F. D. FISHER ET AL 2,065,679
BRAKE
Filed June 22, 1936
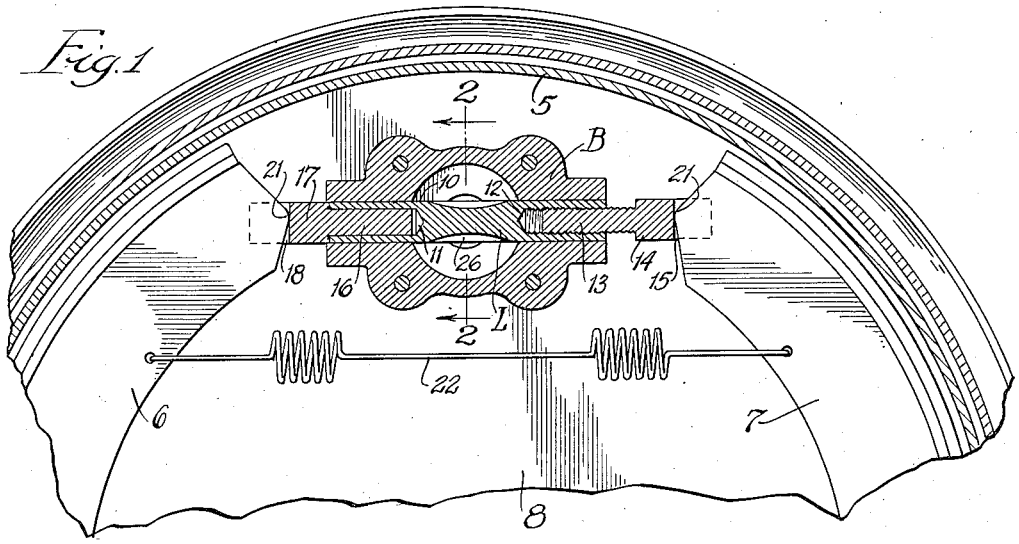
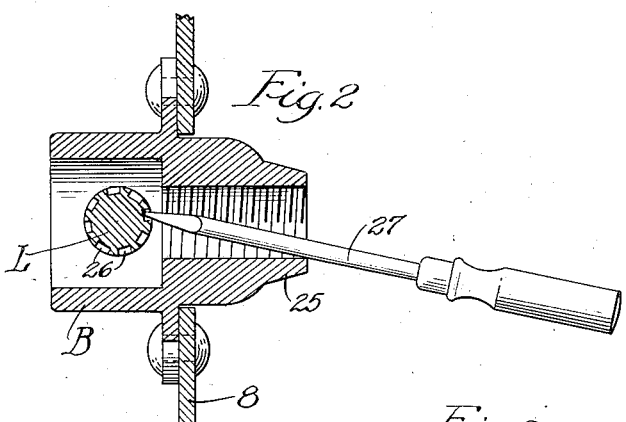
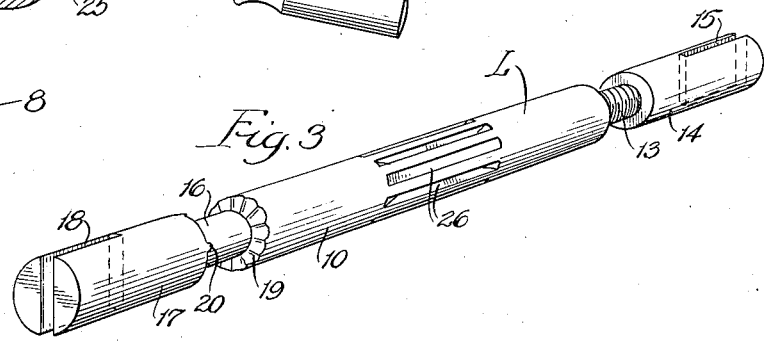
Inventors.
Fred D. Fisher and
George Fisher Jr,
By Banning & Banning
Attys.

Patented Dec. 29, 1936

2,065,679

UNITED STATES PATENT OFFICE 2,065,679

BRAKE

Fred D. Fisher and George Fisher, Jr., Chicago, Ill.

Application June 22, 1936, Serial No. 86,476

3 Claims. (Cl. 188—79.5)

This invention relates to brakes, and more particularly the means for the adjustment thereof to compensate for wear; as illustrated the adjusting means is embodied in a brake of the internal expanding type.

In the usual brake of the internal expanding type, the adjusting mechanism is often inaccessible for operation. Furthermore, such mechanism, if supported in a bearing, is not of the floating type so as to move freely, together with the ends of the brake shoes to which it is connected, in order to maintain a minimum of friction. To provide an adjusting mechanism, supported in an appropriate bearing in a manner which will permit of free longitudinal movements thereof, and at the same time be susceptible of longitudinal extension as required for purposes of wear, and also to remain in any fixed position of adjustment, and be convenient for operation whereby to effect such adjustments, the present improvements have been evolved.

A suggestive embodiment of our invention is set forth in the accompanying drawing in the manner following:

Figure 1 is a vertical section through an adjusting mechanism of a brake such as is commonly employed with automobiles;

Fig. 2 is a detail in section taken on line 2—2 of Fig. 1; and

Fig. 3 is a view in perspective of the adjusting mechanism per se.

In the drawing we have shown the usual drum 5, brake shoes 6 and 7, and backing plate 8. The shoes are adjustably connected together, as indicated in Fig. 1, by means of a link L comprising a cylindrical rod 10 with opposed end sockets 11 and 12, the latter being screw-threaded for co-action with a threaded body 13 on which is formed a head 14 provided with an end slot 15. Into the other socket 11 is fitted a cylindrical body 16 also provided with a head 17 having an end slot 18. The rod end adjacent the head 17 may be toothed or serrated as at 19 (see Fig. 3) for co-action with one or more buttons 20 which are extended from the head, so that rotation therebetween will normally be prevented when the head is urged toward the rod. These two abutting surfaces, one serrated and the other formed with buttons, constitute a detent means which is entirely adequate for the requirements for the present link.

Each brake shoe has one end pointed at 21 opposite the proximate slotted head wherein it may be received for pivotal connection therewith. In addition, a tension means 22 in the form of a spring interconnects the two ends of the shoes for urging them toward each other so that pressure is always maintained upon the two heads.

The adjusting member is journaled within the longitudinal bore of a bracket B that is affixed to the backing plate 8 which forms a support therefor. This bracket is provided with a lateral extension 25 here shown as a hollow boss formed with internal threads. Opposite this boss, the rod is provided with a plurality of longitudinal grooves 26 defining ribs therebetween. A lever such as an ordinary screw driver 27 may be entered through the boss to rest upon the extension as a fulcrum. The end of this lever when engaged with one of the grooves of the rod may apply a force thereto whereby to rotate the body 10 relative to the head 14 which is thereupon moved toward or from the other head. The effect of this is to increase or decrease the spacing between the two brake shoes whereby to effect a desired adjustment as required to compensate for wear. These movements take place against the resistance offered by the detent which thereafter serves to maintain the rod and screwthreaded head in the adjusted position to which they have been advanced by the lever. When so adjusted, the link is free to slide longitudinally within the bracket, i. e., to float therewithin, and while so doing to furnish through its slotted heads a pair of fulcrums on which the brake shoes may pivot slightly in response to expanding movements thereof that occur in operation.

We claim:

1. In combination, a pair of brake shoes, a freely floating extensible connecting link between two adjacent ends thereof in abutting pivotal relation thereto, a support, a bracket secured to the support restraining the link from lateral movement while permitting it to move freely parallel to the support and rotatively to the bracket, the bracket being formed with a lateral extension forming a fulcrum, and the link being provided with a plurality of sockets arranged annularly thereof whereby a lever engaging one socket and fulcrumed upon the lateral extension may advance the link rotatively.

2. In combination, a pair of brake shoes, an extensible connecting link between two adjacent ends of the shoes, tension means urging the said shoe ends toward each other and against opposite ends of the link, the link comprising a pair of slotted heads, one at each end, each accommodating one brake shoe end in non-rotatable pivotal relation, a bar to which the slotted heads are fitted, one by a screw-threaded connection and the other by a freely rotatable connection, and means on one head co-acting with means on the bar forming a detent by which to prevent normally any rotation between the bar and the head which is in screw-threaded connection therewith.

3. In combination with a bracket having a through bore and an extension proceeding transversely therefrom, a pair of brake shoes having adjacent ends at points opposite the bracket ends, a freely floating connection between the said shoe ends comprising a cylindrical bar mounted within the bracket bore for longitudinal and rotary movement therewithin, a pair of slotted heads fitted rotatably to the bar ends and each embracing the proximate shoe end with which it engages pivotably and non-rotatively, and a screw-threaded connection between one slotted head and the bar whereby upon rotation of the latter the former is moved endwise thereof, the bar being formed with means arranged annularly of itself opposite the bracket extension for receiving engagement from a lever fulcrumed upon said extension whereby a rotary force may be applied to the bar.

FRED D. FISHER.
GEORGE FISHER, Jr.